United States Patent [19]
Zelnick

[11] 3,912,575
[45] Oct. 14, 1975

[54] HEAT SEALING APPARATUS USING A WIRE SEALING ELEMENT

[75] Inventor: Seymour Zelnick, Somerville, N.J.

[73] Assignee: Weldotron Corporation, Piscataway, N.J.

[22] Filed: June 18, 1973

[21] Appl. No.: 370,784

Related U.S. Application Data

[63] Continuation-in-part of Ser. No. 269,068, July 5, 1972, abandoned.

[52] U.S. Cl. .............. 156/515; 156/583; 93/33 H; 219/243
[51] Int. Cl.² ................................. B32B 31/20
[58] Field of Search .................. 156/515, 251, 583; 93/33 H, DIG. 1; 219/243; 83/171

[56] References Cited
UNITED STATES PATENTS

| | | | |
|---|---|---|---|
| 2,726,706 | 12/1955 | Hakomaki | 93/DIG. 1 |
| 3,012,387 | 12/1961 | Jacobs et al. | 156/515 X |
| 3,015,600 | 1/1962 | Cook | 156/515 |
| 3,253,122 | 5/1966 | Kochmer et al. | 156/251 |
| 3,496,049 | 2/1970 | Anderson | 156/497 |
| 3,574,039 | 4/1971 | Fehr et al. | 156/515 |
| 3,775,225 | 11/1973 | Schott, Jr. | 156/583 |

*Primary Examiner*—Charles E. Van Horn
*Assistant Examiner*—M. G. Wityshyn

[57] ABSTRACT

The apparatus is an impulse, radiant sealer for heat sealing thermoplastic films for packaging various goods. The apparatus includes means for supporting a flexible wire sealing element freely in space, under light spring tension, and for bringing the sealing element into contact with the films to be sealed, with the films being held flat at the seal area. The apparatus also includes means for heating the sealing element to a high temperature such that the thermoplastic films are sealed together very rapidly.

Because of the high temperature of the sealing element and the high rate of speed with which the seal is made, the effect is such that the apparatus operates as a radiant sealer, and the seal has the appearance of having been made by radiant heat.

15 Claims, 6 Drawing Figures

HEAT SEALING APPARATUS USING A WIRE SEALING ELEMENT

CROSS REFERENCE TO RELATED APPLICATIONS

This application is a Continuation-in-part of application Ser. No. 269,068, filed July 5, 1972, and now abandoned.

BACKGROUND OF THE INVENTION

Generally, in impulse sealing apparatus, two plastic sheets are supported on a support surface, and they are contacted by a wire sealing element through which a suitable heating current is passed. The sealing wire is held in contact with the plastic sheets until the heat generated in the wire cuts the sheets of plastic and welds the adjacent ends together to form the desired seal.

This system of operation and the apparatus for performing it are generally satisfactory and are widely used in the industry. However, certain aspects of the operation and the apparatus present problems which should be eliminated for optimum operation. These problems include: (1) build-up of carbonized plastic on the sealing wire element, and this requires frequent cleaning of the heating element; (2) adherence of carbonized material to the plastic seal and this renders the seal unsightly; and (3) generation of fumes which are unpleasant and possibly toxic to humans and corrosive to metal parts.

In addition, in the past, it has been customary to support the sealing wire on a backing member so that, when the sealing wire is brought into contact with the plastic films which are seated on a support member, the sealing wire is, in effect, clamped between two rigid plates. With such an arrangement, when the sealing wire is heated, it expands unevenly and tends to bow, and this is compensated for by spring-biasing the wire. However, a comparatively strong spring is required to maintain sufficient tension on the sealing wire to prevent the uneven expansion and bowing. The combination of the strong spring tension and the heating and cooling of the wire during the sealing operation puts considerable tensile stress on the wire, particularly at its ends, and this results in an undesirable shortening of the useful life of the sealing wire.

Various attempts have been made to solve the above-enumerated problems; however, they have not been completely satisfactory, especially for polyvinyl chloride films.

SUMMARY OF THE INVENTION

Briefly, the invention comprises impulse radiant sealing apparatus which includes a wire-like heat-sealing element, supported freely in space, and means for bringing the sealing element into sealing relationship with the films to be sealed and cut. The apparatus also includes means for heating the sealing element rapidly to such a high temperature that the sealing element seals the films with only instantaneous contact therewith.

DESCRIPTION OF THE PREFERRED EMBODIMENTS

Figure 1:
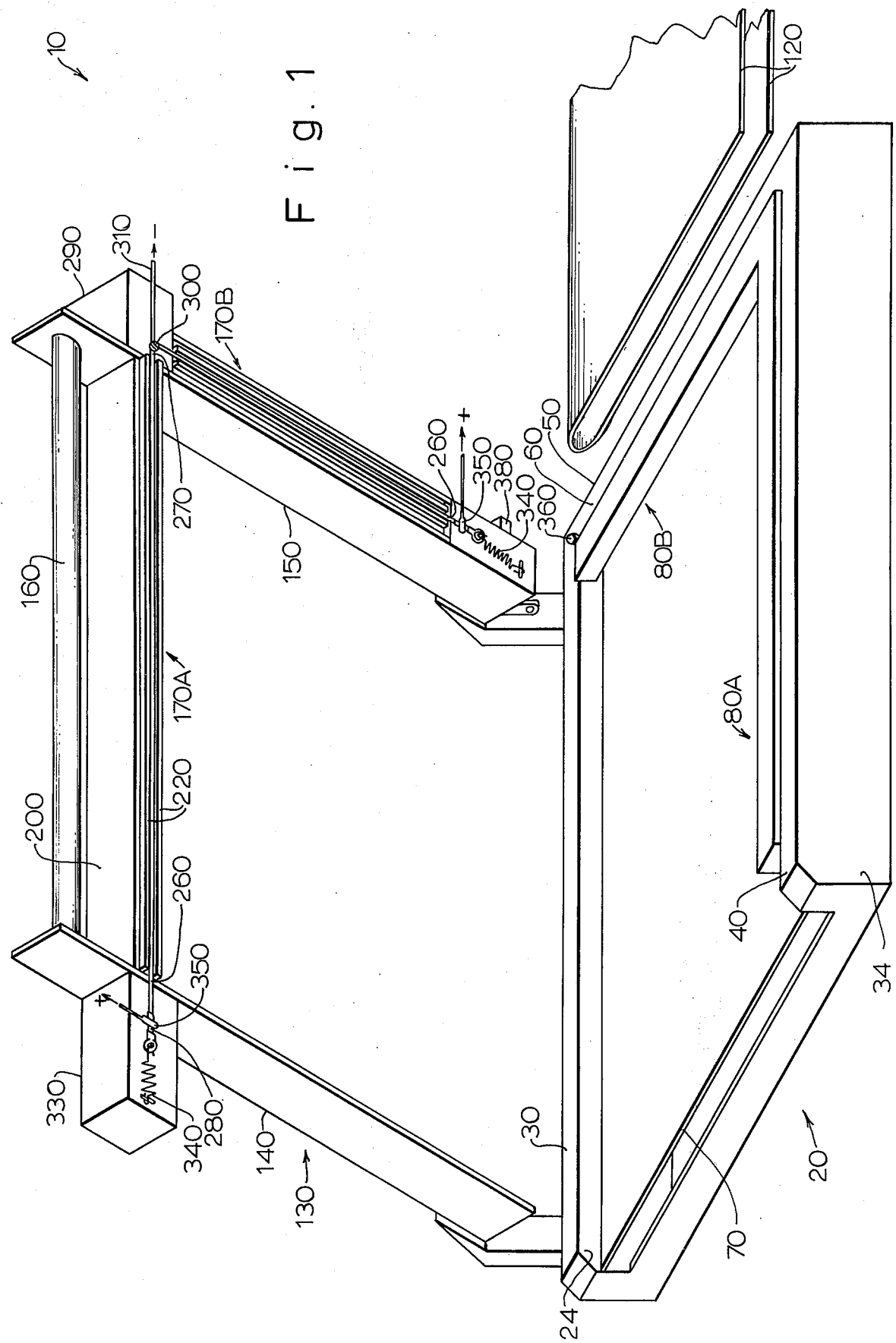
FIG. 1 is a perspective view of apparatus embodying the invention.

The principles of the invention may be employed with many types of sealing apparatus, and, for purposes of illustration, an L-sealer of the type described in U.S. Pat. No. 3,496,049 is shown and described herein as the environment for the apparatus and method of the invention. Referring to the drawings, the sealer 10 comprises a base 20 including a rear wall 24 having a top edge 30, a front wall 34 having a top edge 40, and a side wall 50 having a top edge 60. A support plate 70 is disposed between the front and rear walls and below the top edges thereof for supporting articles to be packaged.

Two support members 80 (A and B) (FIGS. 1 and 2) are provided for supporting films to be sealed and for cooperative operation with the sealing members to be described, and each member 80 comprises a metal or insulating bar 90 carrying on its top surface a sheet 100 of resilient insulating material, such as silicone rubber, coated with a layer 110 of Teflon tape. One member 80A is secured to the inner surface of the front wall 34 and positioned so that it is accessible above the top edge 40 thereof; and the other member 80B is similarly disposed adjacent to the top edge 60 of side wall 50.

The apparatus 10 is used to seal sheets or films 120 of polyvinyl chloride thermoplastic film along the aligned long edges thereof and across the width thereof, as is well known. The thermoplastic material is center-folded, to form the films 120, and it is fed in this form to the sealing assembly from a roll (not shown) suitably mounted adjacent to the apparatus 10.

The sealing assembly includes a generally U-shaped frame 130, comprising side bars 140 and 150 and a handle 160. The U-shaped frame is suitably pivotally secured to the base 20 adjacent to the rear wall 24 thereof so that it can be pivoted toward and away from the base 20.

The sealing assembly of apparatus 10 includes two substantially identical sealing members 170 (A and B), with member 170A disposed longitudinally and suitably secured between bars 140 and 150 of frame 130 and operable with film support member 80A, and with member 170B oriented at a right angle thereto, suitably secured to bar 150, and adapted to operate with film support member 80B. The two portions 170 of the sealing assembly are substantially identical in construction, and similar parts thereof carry the same reference numerals.

Figure 2:
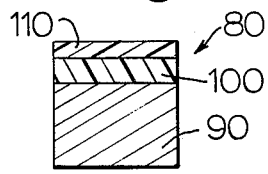
FIG. 2 is a sectional elevational view of a portion of the apparatus of FIG. 1.
Figure 4:
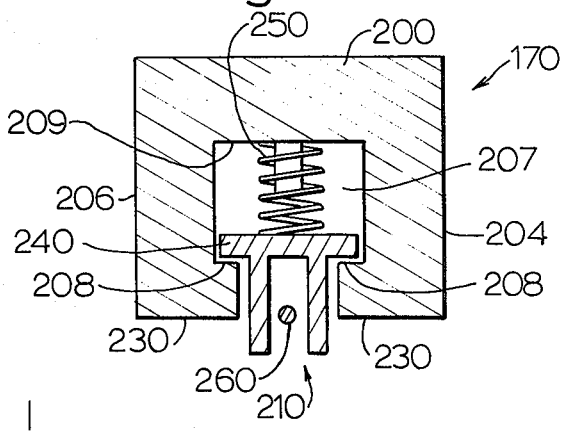
FIG. 4 is a sectional view along the lines 4—4 in FIG. 3.
Figure 3:
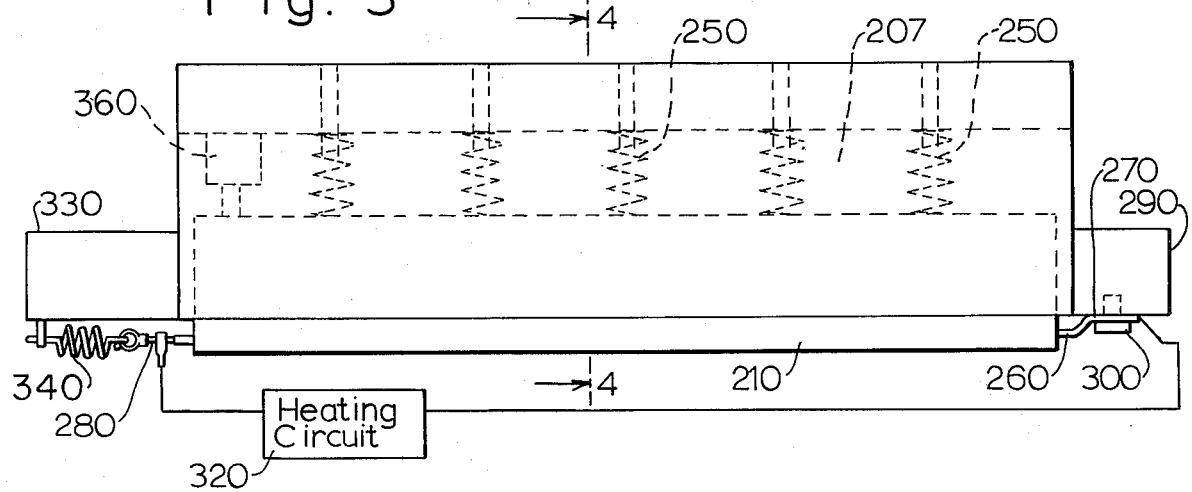
FIG. 3 is a front elevational view of a portion of the apparatus of FIG. 1.

According to the invention and referring to FIGS. 1, 3, and 4, sealing apparatus 170 includes a generally U-shaped bar 200, preferably of metal, which includes two spaced-apart legs 204 and 206 which form a longitudinal chamber 207. The bar 200 is oriented with its legs facing downwardly. The inner surfaces of the legs 204 and 206 are shaped to provide opposed ledges 208 for supporting a member known as a film clamp 210. The film clamp 210 is substantially the same length as the bar 200 and is disposed within the chamber 207 between the legs 204 and 206. The film clamp includes two spaced-apart, parallel legs 220 which extend beyond the lower surface 230 of the legs of the bar 200, and the legs 220 of the film clamp depend from a horizontal cross-member 240 which seats on the ledges 208 and thus holds the film clamp in place in the chamber 207.

The film clamp 210 is of a material which is electrically non-conductive, heat-resistant, and has plastic release properties. In one suitable construction, the film clamp was made of aluminum having a Teflon, hard-coat finish.

A plurality of helical compression springs 250, or the like, are spaced apart along the length of the chamber 207 between the upper wall 209 of the chamber and the cross member 240 of the film clamp 210. The springs 250 bear on the film clamp and keep it in place, pushed outwardly, between the legs 204 and 206 of bar 200. The springs are held in place, if necessary, on bolts, pins, or the like, or in any suitable manner. Thus arranged, the film clamp 210 is slidable into and out of chamber 207 in bar 200 between legs 204 and 206 thereof and in a direction transverse to the long axes of the film clamp and bar.

Further, according to the invention, a flexible wire sealing element 260 is positioned in the space between the legs 220 of the film clamp 210. It is noted that the wire is disposed freely in space, unsupported along its length and supported or secured only at its ends. One end 270 of the wire is fixed in place, and the other 280 is lightly spring-loaded so that, in the use to be described, as the wire is heated and expands, the spring-loading maintains the wire straight and taut. The end mounting arrangements may take any suitable form, and typical suitable arrangements are shown in U.S. Pat. No. 3,496,049 and U.S. Pat. No. 3,253,122.

For example, for the fixed mounting, an insulating block 290 is secured to the outer surface of bar 150 of the U-shaped frame 130, and the end 270 of wire 260 is secured thereto by means of a metal or insulating screw 300. A terminal 310 may also be secured by the screw 300 in contact with the wire 260 for connection to an electrical heating circuit represented by block 320 in FIG. 3. Alternatively, the block 290 may be of metal, with the wire and terminal secured thereto between a pair of insulating plates (not shown). Other suitable arrangements will occur to those skilled in the art.

The spring-biased end 280 of wire 260 may be connected as shown in the above-mentioned patents, and the relatively simple arrangement of the latter patent is illustrated. This wiresecuring arrangement includes an insulating or metal block 330 secured to the outer surface of the bar 140 of the U-shaped frame 130. The wire end 280 is suitably secured to a spring 340 which is secured to the block. A suitable terminal 350 is secured to the wire 260 for connection to the electrical circuit 320.

The wire sealing element 260 is preferably of Nichrome and is preferably a stranded cable. In this form, the sealing wire is extremely flexible and can easily be kept straight and taut by means of light spring tension Nichrome, as defined in the Dictionary of Metallurgy, 1965 Chaucer Press, is a trade name for a group of high-nickel alloys with chromium, or with iron and chromium.

It is understood, of course, that, where required, all parts of the sealer 10 are suitably electrically insulated from each other.

In one form of the sealing apparatus 170 embodying the invention, the legs 220 of the film clamp 210 were spaced apart 50 mils, and they protruded beyond the lower surfaces 230 of the legs 204 and 206 of the bar 200 by about one-eighth to one-quarter inch, and the wire 260 had a diameter of 36 mils. Thus, each leg was spaced about 7 mils from the sealing wire. According to the invention and for a purpose described below, the legs 220 of the film clamp are positioned as close as possible to the wire sealing element 260 for a purpose to be described.

In operation of the sealer 10, the sealing wires 260 are connected to the electrical circuit 320 for generating a pulse of current suitable for heating the wires to sealing temperature higher than that normally employed in the prior art. Favorable operation is achieved if the wires are heated red hot. Such circuits are easily devised by those skilled in the art and need not be described in detail herein. A typical circuit is shown and described in U.S. Pat. No. 3,496,049, and such a circuit may be readily designed to provide the necessary current for the sealing wires 260.

The circuit 320 may be operated by means of a switch 360 mounted on the base 20, and it may be operated by hand or automatically by means of a contact arm 380 secured to bar 150 of the U-shaped frame 130. Alternatively, switch 360 may be mounted in chamber 207 in bar 200 and in operative relation with film clamp 210 (FIG. 3).

Briefly, in sealing sheets of film to form packages, first the free leading ends of the film are sealed together, if they are unsealed. Next, articles are inserted between the films, and the L-shaped seal is made to complete the package. More specifically, the apparatus of the invention operates as follows.

Figure 5:
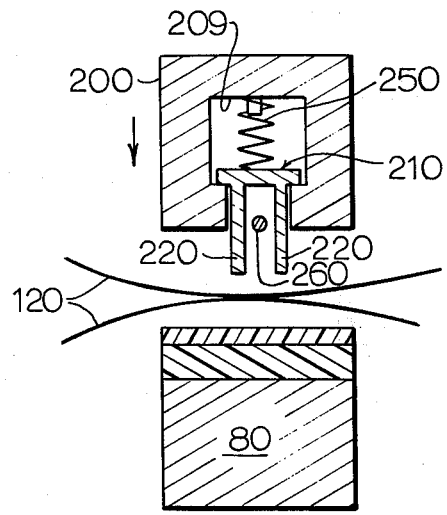
FIG. 5 is a sectional view of a portion of the apparatus of the invention at one step in the operation thereof.
Figure 6:
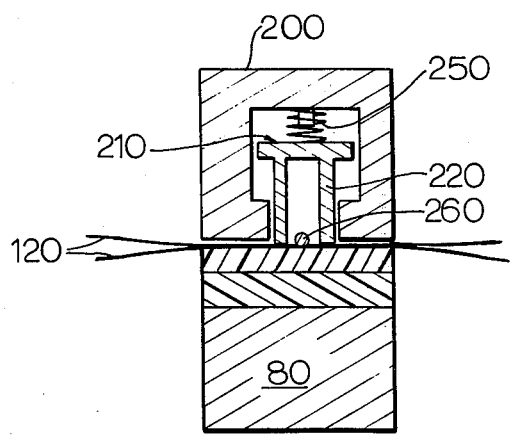
FIG. 6 is a view of the apparatus of FIG. 5 at a later step in the operation thereof.

Referring to the drawings and, particularly, to FIGS. 5 and 6, in operating the sealer 10 to make an L-shaped seal in the plastic sheets 120, the U-shaped frame 130, which is normally elevated, is pivoted downwardly toward the folded sheets of film which overlay the base 20 with their adjacent long edges disposed on backing member 80A and the desired transverse seal area disposed on the backing member 80B. As the U-shaped frame 130 comes into operative relation with the films, the legs of the film clamp 210 contact and press down on the films 120 against the backing members 80. Continued downward pressure on the assembly 130 pushes the film clamp 210 into the chamber 207 in the bar 200 against the springs 250 to bring the wire sealing elements 260 into contact with the plastic films. Under the pressure of the springs 250, the legs of the film clamp bear firmly on the films 120 along their entire lengths closely adjacent to the sealing wires 260, so that any folds or distortions in the films are pressed flat and a good, tight seal is made all along the length and width of the films.

When the sealing wires 260 come into contact with the films 120, the switch 360 is operated either by hand or automatically, and circuit 320 generates a pulse of current which flows through the wires 260 and rapidly brings the wires to red heat. Almost instantaneously, the sealing wires cut through the films 120, and thereafter, heat which radiates from the hot wires causes the cut edges of the films to melt and to bead back to the adjacent legs of the film clamp 210 to form the desired strong seals. Thereafter, the U-shaped frame 130 is raised, and the next lengths of sheets 120 to be sealed are moved into position for sealing. The feed of the plastic sheets may be controlled automatically, if desired, and, as the seals are made, the plastic packages formed thereby may be transmitted to other processing equipment such as a shrink tunnel or the like.

It is noted that seals made by the apparatus of the invention are strong, clean and non-carbonzied and either no plastic adheres to the heating wires 260 or, if any adheres, it burns off immediately. In addition, little or no fuming of the plastic occurs. It is believed that this improved operation results from the fact that the sealing wires are heated to higher temperatures than those employed in the prior art. The high heat generated causes the film to melt almost instantaneously and thus to lose contact with, and pull away from, the sealing wires almost instantaneously. Because of the manner in which the sealing wires are supported and because they are under only light spring tension, they are not subject to extreme tensile strains and their life is increased.

To recapitulate the advantages of the invention and the functions of some of the features thereof, in practicing the invention, optimum operation is achieved if legs 220 of clamp 210 are as close as possible to the heating element 260, so that they hold the film firmly in place and press out any wrinkles in the seal region to make a hole-free seal. On the other hand, however, the legs cannot be so close to the heating element that they become excessively heated themselves. If the legs did become so heated, they themselves might melt the film material and adversely affect the seal. In the prior art, where continuous heating of a sealing element was employed, the legs of the associated clamp, if present, had to be positioned considerably farther than in the present invention to avoid such a problem. Thus, in the prior art, wrinkles tend to be present and holes are often found in the seals.

Another important feature of the present invention is the use of a stranded wire for the heating element 260. This type of wire is extremely flexible and thus can be held straight and taut with minimal tension and by means of supporting elements provided only at its ends and not along its length as is generally required in the prior art with other types of heating elements, particularly solid wires. In addition, the stranded wire is selected to have suitably small diameter and mass so that it can heat and cool relatively quickly as it goes through a sealing cycle. Thus, the stranded wire can be heated by current pulses, which means that it can be heated quickly to suitably high temperatures and it will cool suitably quickly. At the same time, the closely positioned legs of the clamp will not become heated to an unsuitably high temperature, and a good seal will be made as described above. It is to be noted that, since the heating wire is supported only at its ends and not along its length, as in the prior art, there is minimal heat loss therefrom and the sealing operation is efficient.

Referring again to the heating wire, since its nature permits it to be pulsed to a very high temperature, red heat, at the time a sealing operation is performed, the film which is being cut and sealed either does not stick to the heating element, or if any film does stick, it is immediately burned off. Thus, the heating element remains clean to achieve effective severing of the film repeatedly, and there is advantageously no smell of burning film.

Further, the stranded nature and low mass of the heating element 260 means that this heating element can be maintained in place with very little tension at its ends. As a further consequence, the heating element can have a very long life, since the tensile strength is known to decrease significantly with higher temperatures and repeated cycling. Also, the absence of heat sinks along its length serves to remove stress points which might ultimately result in the rupture of the heating element under its tensioned condition.

The spacing between the legs 220, according to the present invention, should be no more than about three-thirty seconds inch plus or minus a few mils, and preferably about one-sixteenth inch. The minimum spacing will, of course, be limited by the diameter of the heating element 260. The legs should not be so close together that they touch the heating element, since undesirable heat loss from the wire would result. As noted above, a spacing of 7 mils from the heating wire can be used. However, spacings up to about 14 mils have also been used successfully, with a wire diameter of 36 mils.

In addition, as noted, using the stranded wire for the heating element, which is spring mounted at its ends, requires considerably less tension than in the case of the unstranded heating wires of the prior art. For example, in the prior art, spring tension of the order of 15 pounds is common, whereas in the present invention, the tension is less than one pound, and may be in the range of 0.3 to about 5 pounds.

What is claimed is:

1. Heat sealing apparatus comprising
    a base providing support for films of material to be sealed together by the application of heat thereto, and
    a heat-sealing assembly movable into and out of operative relation with said base and including
    a flexible wire sealing member secured to said heat-sealing assembly only at its ends and unsupported between its ends,
    said wire sealing member comprising a stranded cable and having terminals at its ends for receiving electrical current for heating said sealing member to red heat.

2. The apparatus defined in claim 1 wherein said wire is of an alloy including nickel and chromium.

3. Heat sealing apparatus comprising
    a base providing support for films of material to be sealed together by the application of heat thereto, and
    a heat-sealing assembly movable into and out of operative relation with said base and including
    a flexible wire sealing member secured to said heat-sealing assembly only at its ends and unsupported between its ends,
    said wire sealing member having terminals at its ends for receiving electrical current for heating said sealing member to red heat,
    said flexible wire comprising a stranded wire which is spring-mounted at its ends with a spring tension force of the order of one pound.

4. Heat sealing apparatus comprising a base providing support for films of material to be sealed together by the application of heat thereto, and a heat-sealing assembly movable into and out of operative relation with said base and including a flexible wire sealing member secured to said heat-sealing assembly only at its ends and unsupported betweeen its ends, said wire sealing member having terminals at its ends for receiving electrical current for heating said sealing member to red heat, said flexible wire comprising a stranded wire which is spring-mounted at its ends with a spring tension force of the order of 0.3 to 5 pounds.

5. Heat sealing apparatus comprising a base providing support for films of material to be sealed together by the application of heat thereto, and a heat-sealing assembly movable into and out of operative relation with said base and including a flexible wire sealing member secured to said heat-sealing assembly only at its ends and unsupported between its ends, said wire sealing member comprising a stranded cable having terminals at its ends, and circuit means coupled to said wire sealing member for applying current pulses thereto for heating said sealing member to red heat.

6. Heat sealing apparatus comprising a base providing support for films of material to be sealed together by the application of heat thereto, and a heat-sealing assembly movable into and out of operative relation with said base and including a first fixed elongated generally U-shaped member having a long axis and having an outer surface adjacent to and facing said films to be sealed, a second elongated generally U-shaped film-clamping member slidably disposed within said first member and extending along the length thereof, said second member being slidable into and out of said first member in a direction perpendicular to the long axis of said first member and perpendicular to the surfaces of said films, said second member having a pair of closely spaced legs extending beyond said outer surface of said first member and facing said films and bearing against the films during a sealing operation, and a flexible wire member for cutting and sealing said films secured to said heat-sealing assembly only at its ends and unsupported between its ends, said wire member being disposed between said legs of said second member and contacting said films, when said second member slides into said first member, to seal and cut said films, said wire member comprising a stranded cable having terminals at its ends for receiving electrical current for heating it to red heat.

7. The apparatus defined in claim 6 wherein said first member includes a longitudinal chamber in which said second member is disposed and including spring means, within said chamber, urging said second member out of said first member in a direction transverse to the long axis of said first member and perpendicular to said films.

8. The apparatus defined in claim 6 wherein said legs of said second member are positioned sufficiently close to said sealing wire so that, when said second member and said wire are in sealing position on said films, said legs of said second member press said films flat adjacent to said wire and along the length thereof.

9. The apparatus defined in claim 8 wherein said legs are spaced apart about 7 mils or less from said sealing wire.

10. The apparatus defined in claim 8 wherein said legs are spaced apart a distance of the order of one-sixteenth inch.

11. The apparatus defined in claim 6 and including means, for generating electrical pulses, coupled to said wire member.

12. Heat sealing apparatus comprising a base member providing support for films of material to be sealed together by the application of heat thereto, and a heat-sealing assembly movable into and out of operative relation with said base and including a generally U-shaped fixed first member including a base and two legs and having inner walls which define a chamber which extends along the length of said first member, a portion of said inner walls of said chamber including ledges which project into said chamber, a second elongated generally U-shaped film-clamping member disposed within said chamber and including a base portion and two legs, short projecting walls extending laterally from said legs at said base portion and adapted to seat on said ledges to prevent said second member from falling out of said first member, said legs of said second member being closely-spaced and extending out of said chamber between said legs of said first member, spring means disposed within said chamber in contact with said second member and urging said second member outwardly from said chamber, whereby said second member can bear against and clamp the films being sealed during a sealing operation, and a flexible wire member for cutting and sealing said films secured to said heat-sealing assembly only at its ends and unsupported between its ends, said wire member having terminals at its ends for receiving electrical current for heating it to red heat, said wire member being disposed between and close to said legs of said second member and operable to cut and seal said films.

13. The apparatus defined in claim 12 wherein said wire member is a stranded cable.

14. The apparatus defined in claim 12 wherein said wire is a stranded cable and is of a nickelchromium alloy.

15. The apparatus defined in claim 12 and including means, for generating electrical pulses, coupled to said wire member.

* * * * *